(12) United States Patent
Zhao et al.

(10) Patent No.: US 12,361,572 B2
(45) Date of Patent: Jul. 15, 2025

(54) SYSTEM AND METHOD OF AUTOMATIC IMAGE VIEW ALIGNMENT FOR CAMERA-BASED ROAD CONDITION DETECTION ON A VEHICLE

(71) Applicant: GM Global Technology Operations LLC, Detroit, MI (US)

(72) Inventors: Qingrong Zhao, Warren, MI (US); Farui Peng, Sterling Heights, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 533 days.

(21) Appl. No.: 17/815,760

(22) Filed: Jul. 28, 2022

(65) Prior Publication Data
US 2024/0046491 A1    Feb. 8, 2024

(51) Int. Cl.
*G06T 7/33*    (2017.01)
*G06T 5/80*    (2024.01)
*G06V 20/56*    (2022.01)

(52) U.S. Cl.
CPC ............ *G06T 7/337* (2017.01); *G06V 20/588* (2022.01); *G06T 2207/30252* (2013.01)

(58) Field of Classification Search
CPC . G06T 7/337; G06T 2207/30252; G06T 5/80; G06T 7/33; G06V 20/588; G06V 20/56; B60W 40/02
See application file for complete search history.

(56) References Cited

U.S. PATENT DOCUMENTS

2009/0179916 A1*   7/2009   Williams .............. G06T 7/80
                                       345/629
2018/0084236 A1*   3/2018   Weng ................ H04N 13/246
2019/0335100 A1*   10/2019   Chen ................. G06V 20/56

FOREIGN PATENT DOCUMENTS

DE       102017100062 A1 *   7/2018  ............ G06T 7/579

OTHER PUBLICATIONS

Seo, Young-Woo "Detection and tracking the vanishing point on the horizon." CME-RI-TR-14 7 (2014), (Year: 2014).*
Scaramuzza et al. "A Toolbox for Easily Calibrating Omnidirectional Cameras," 2006 IEEE/RSJ International Conference on Intelligent Robots and Systems, 2006, pp. 5695-5701.

* cited by examiner

*Primary Examiner* — Andrew M Moyer
*Assistant Examiner* — Dylan John Mendez Muniz
(74) *Attorney, Agent, or Firm* — Vivacqua Crane, PLLC

(57) ABSTRACT

A system and method of automatic image view alignment for a camera-based road condition detection on a vehicle. The method includes transforming a fisheye image into a non-distorted subject image, comparing the subject image with a reference image, aligning the subject image with the reference image, and analyzing the aligned subject image to detect and identify road conditions in real-time as the vehicle is in operation. The subject image is aligned with the reference image by determining a distance (d) between predetermined feature points of the subject and reference images, estimating a pitch $\theta$ of a projection center based on the distance d, and generating an aligned subject image by applying a rectification transformation on the fisheye image by relocating a center of projection of the fisheye image by the pitch angle $\theta$.

15 Claims, 10 Drawing Sheets

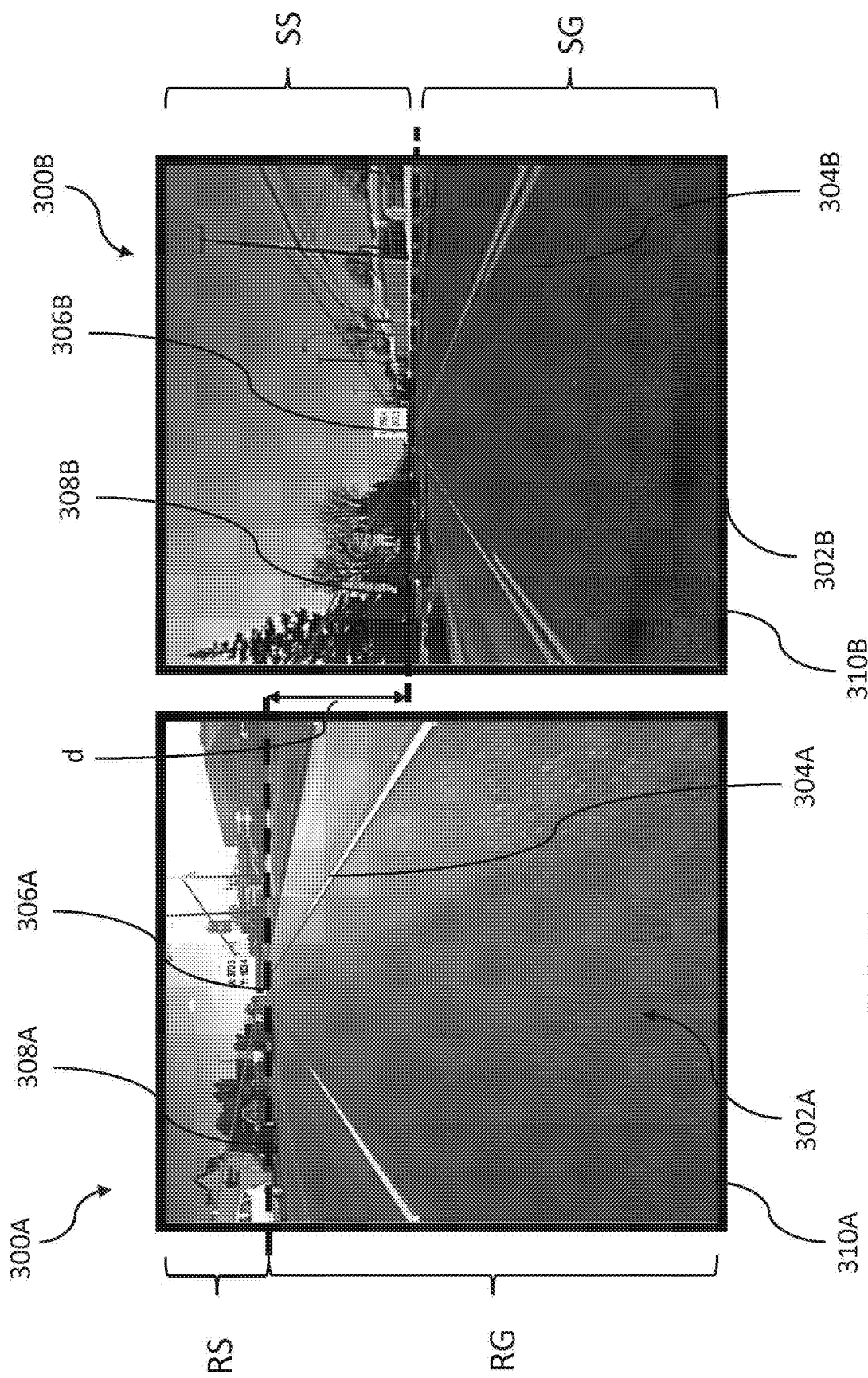

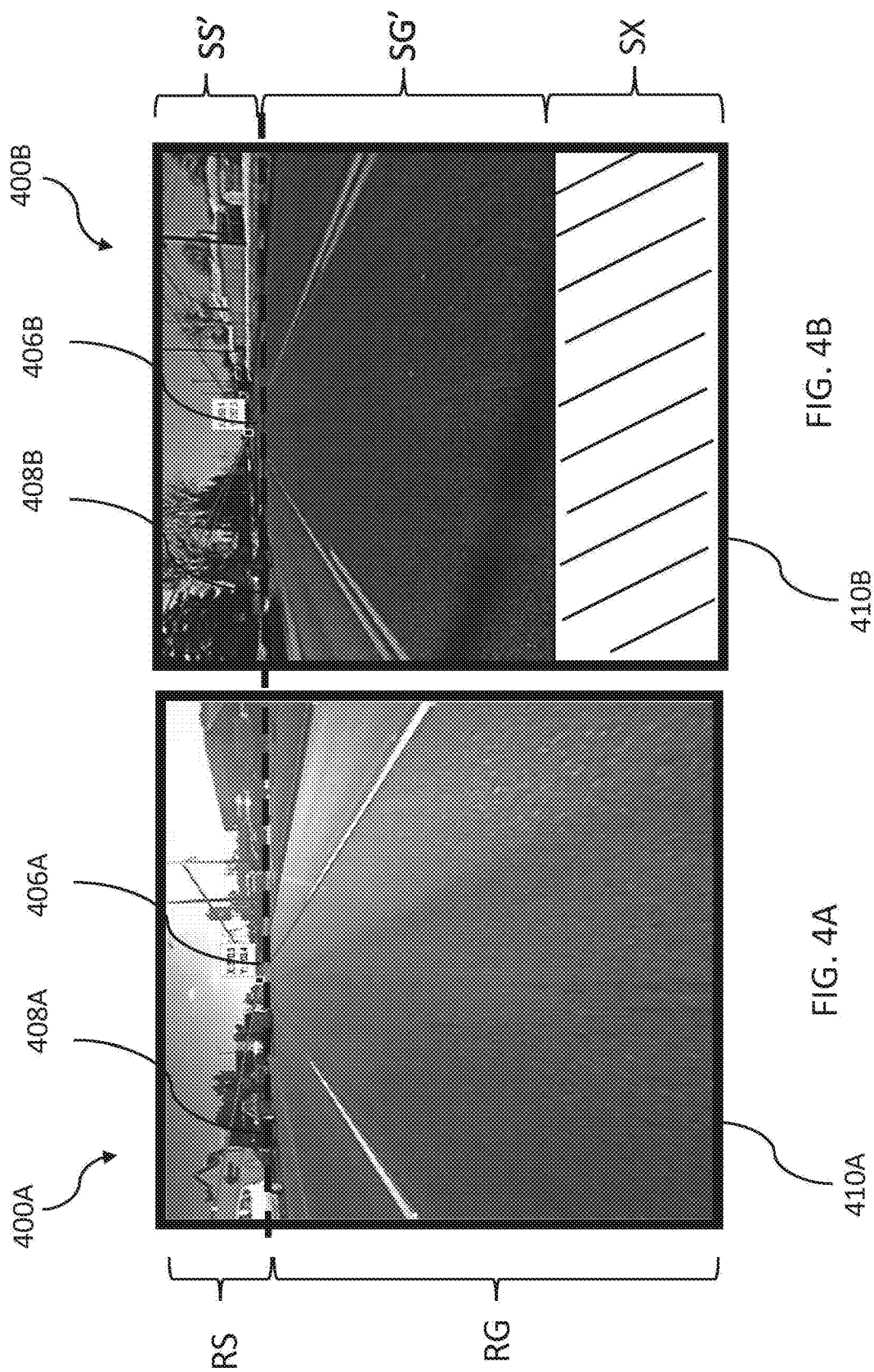

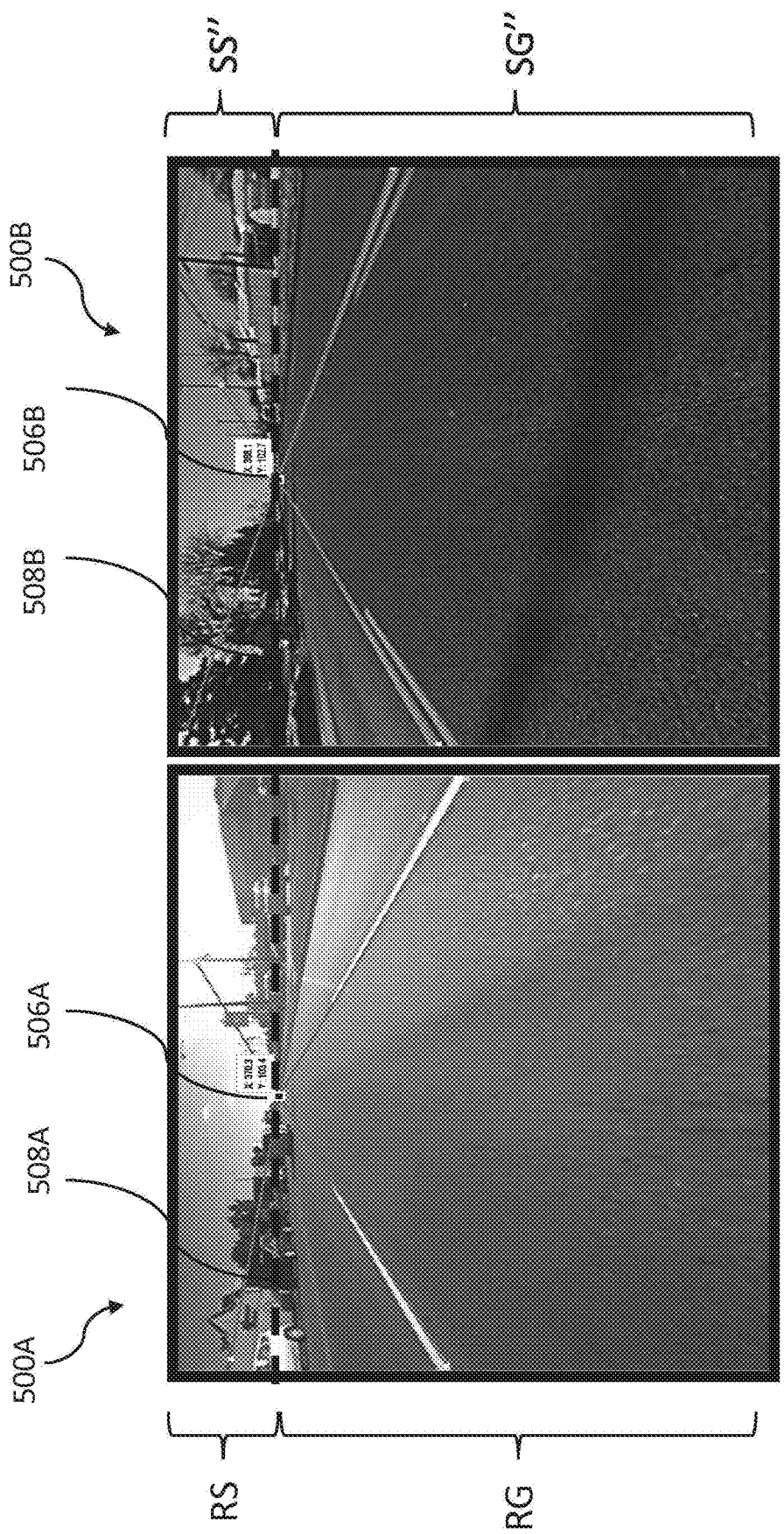

SYSTEM AND METHOD OF AUTOMATIC IMAGE VIEW ALIGNMENT FOR CAMERA-BASED ROAD CONDITION DETECTION ON A VEHICLE

INTRODUCTION

The present disclosure relates to advanced driver assistance system equipped vehicles, more specifically to a system and method of automatic image view alignment for a camera-based road condition detection on such a vehicle.

Advanced Driver Assistance Systems (ADAS) are intelligent systems that reside onboard a vehicle and used to enhance or automate functions of various vehicle systems. A typical ADAS includes a control module, also referred to as a controller, that is in communication with vehicle sensors such as exterior, interior, and state sensors, as well as with various vehicle systems such as steering, acceleration, braking, and safety systems. The controller analyzes information gathered by the vehicle sensors and generate instructions for operating the vehicle ranging from a partial autonomous mode to a full autonomous mode in accordance with the levels of driving automation as provided in SAE J3016 publication.

The controller is in communications with the exterior sensors to continuously collect data on the external surroundings of the vehicle. An exterior sensor that the ADAS typically relies on is that of an optical camera. One or more optical cameras are placed in predetermined positions on the vehicle to capture images of the visible external surroundings of the vehicle. The images are analyzed by the controller to detect and identified road lanes, road conditions, and objects on the roads such as signs, signals, pedestrians, etc. The captured images may also be used by artificial intelligence and neural networks to train and improve existing ADAS applications or to develop new ADAS applications.

For some vision based ADAS applications, such as camera-based slippery road condition detection, image collection could be time consuming and challenging. Therefore, it is desired to leverage image collection using multiple vehicles. It is also desired for solutions developed in one vehicle to work robustly in other similarly equipped vehicles in real-time. However due to the variability of build of different vehicles and assembly of optical cameras onto these different vehicles, the images captured by the various vehicles might not be in alignment with one another or those of reference images used in the development and training of the ADAS applications used in the vehicles.

The non-alignment of images with of the various vehicles and the reference images may increase the computational demand on the controller of the vehicles to identify the road conditions in real-time resulting in less efficient operation of the ADAS. Thus, while the current method of processing collected images for the operation of ADAS achieves its intended purpose, there is a need for a system and a method of aligning the subject images with reference images in real-time for the improved operations of the ADAS.

SUMMARY

According to several aspects, a method of image alignment for an advanced driver assistance system (ADAS) equipped vehicle is disclosed. The method includes capturing a subject fisheye image of an external field of view surrounding the subject vehicle; transforming the subject fisheye image into a subject rectilinear image; retrieving a reference rectilinear image of an external field of view surrounding a reference vehicle; determining a distance (d) between the subject feature point in the subject rectilinear image and the reference feature point in the reference rectilinear image; calculating a pitch angle $\Theta$ to align the subject feature point with the reference feature point when the determined distance (d) is greater than a predetermined threshold; and generating an aligned subject rectilinear image by applying a rectification transformation on the subject fisheye image by relocating a center of projection of the subject fisheye image by the pitch angle $\Theta$.

In an additional aspect of the present disclosure, the subject feature point includes at least one of a vanishing point and a horizon. The distance (d) is a vertical distance. The aligned subject rectilinear image includes a sky portion to a ground portion ratio of SS":SG". The reference rectilinear image includes a sky portion to a ground portion ration of RS:RG. SS:SG is substantially equal to RS:RG.

In an additional aspect of the present disclosure, the reference rectilinear image is transformed from a reference fisheye image captured by an optical camera mounted on a reference vehicle.

In an additional aspect of the present disclosure, the pitch angle $\Theta$ is applied in an un-distortion mapping function:

$$F(Rp', K)$$

where:

$$R = \begin{pmatrix} 1 & 0 & 0 \\ 0 & \cos\theta & -\sin\theta \\ 0 & \sin\theta & \cos\theta \end{pmatrix}$$

p'=coordinate on a raw image plane; and
K=intrinsic camera parameters.

In an additional aspect of the present disclosure, the method further includes generating an alignment requirement flag when the determined distance (d) is greater than the predetermined threshold and storing the alignment requirement flag and the calculated pitch angle $\Theta$ in a non-transitory memory unit.

In another aspect of the present disclosure, the method further includes capturing a second subject fisheye image of the external field of view surrounding the subject vehicle; determining whether the alignment requirement flag is stored in the non-transitory memory unit; and applying the rectification transformation on the second subject fisheye image by relocating a center of projection of the second subject fisheye image by the pitch angle $\Theta$ when the alignment requirement flag is determined to be stored in the non-transitory memory unit.

In another aspect of the present disclosure, the method further includes inverse-transforming the subject fisheye image into a subject camera frame; correcting subject camera frame to match a coordinate of a reference camera frame; transforming the corrected subject camera frame into a corrected subject fisheye image; and transforming the corrected subject fisheye image into the subject rectilinear image.

In another aspect of the present disclosure, the method further includes generating an aligned subject rectilinear image in real-time; sending the aligned subject rectilinear image to the controller; and analyzing the aligned subject rectilinear image by the controller to execute an ADAS application.

According to several aspects, an automatic image view alignment system for an advanced driver assistance system equipped vehicle (ADAS vehicle). The system includes an optical camera configured to capture a subject fisheye image of an external field of view surrounding the subject vehicle. The system further includes a controller programmed to transform the subject fisheye image into a subject rectilinear image, determine the subject rectilinear image does not include a sky to ground ratio (SS":SG") substantially similar to a sky to ground ratio (RS:RG) of a reference rectilinear image, and apply a rectification transformation on the subject fisheye image by relocating a center of projection so that the ratio of (SS":SG") in the subject rectilinear image is substantially the same as the ratio (RS:RG) in the reference rectilinear image In another aspect of the present disclosure, the controller is further programmed to detect a subject feature point in the subject rectilinear image, detect a reference feature point in the subject rectilinear image; and determine a difference in a vertical distance (d) between the subject feature point and the reference feature point when the subject rectilinear image is compared side-by-side to the reference rectilinear image. The subject feature point is one of a horizon and a vanishing point in the subject rectilinear image. The reference feature point is a corresponding one of a horizon and a vanishing point in the reference rectilinear image.

In another aspect of the present disclosure, the controller is further programmed to calculate a pitch angle $\Theta$ based on the distance (d) such that the subject feature point aligns with the reference feature point, and apply the rectification transformation on the subject fisheye image by relocating the center of projection of the subject fisheye image by the pitch angle $\Theta$.

In another aspect of the present disclosure, the system further includes a non-transitory memory unit configured to store the calculated pitch angle $\Theta$; and a processor configured to retrieve the calculated pitch angle $\Theta$ from the non-transitory memory unit and apply the rectification transformation on the subject fisheye image by relocating the center of projection of the subject fisheye image by the pitch angle $\Theta$.

According to several aspects, a computer readable medium is disclosed. The computer readable medium includes instructions stored thereon for aligning an image view for a Vehicle, that upon execution by a processor, cause the processor to: transform a subject fisheye image into a subject rectilinear image; compare the subject rectilinear image side-by-side with a reference image; determine a distance (d) between a subject feature point in the subject rectilinear image and a reference feature point in the reference rectilinear image; calculate a pitch angle $\Theta$ to align the subject feature point with the reference feature point when the determined distance (d) is greater than a predetermined threshold; and generate an aligned subject rectilinear image by applying a rectification transformation on the subject fisheye image by relocating a center of projection of the subject fisheye image by the pitch angle $\Theta$.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3A is an undistorted image transformed from a fisheye distorted image taken by a front camera on the reference vehicle of FIG. 2A, according to an exemplary embodiment;

FIG. 3B is an undistorted image transformed from a fisheye distorted image taken by a front camera on the subject vehicle FIG. 2B, according to an exemplary embodiment;

FIG. 4A is an undistorted image transformed from the fisheye distorted image taken by the front camera on the reference vehicle of FIG. 2A, according to an exemplary embodiment;

FIG. 4B is a shifted undistorted image transformed from the fisheye distorted image taken by the front camera on the subject vehicle, according to an exemplary embodiment;

FIG. 5A is the undistorted image transformed from the fisheye distorted image taken by the front camera on the reference vehicle of FIG. 2A, according to an exemplary embodiment;

FIG. 5B is an undistorted image transformed from a realigned projection center fisheye distorted image taken by the front camera on the subject vehicle, according to an exemplary embodiment;

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

As used herein, the term module refers to any hardware, software, firmware, electronic control component, programmable controller, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
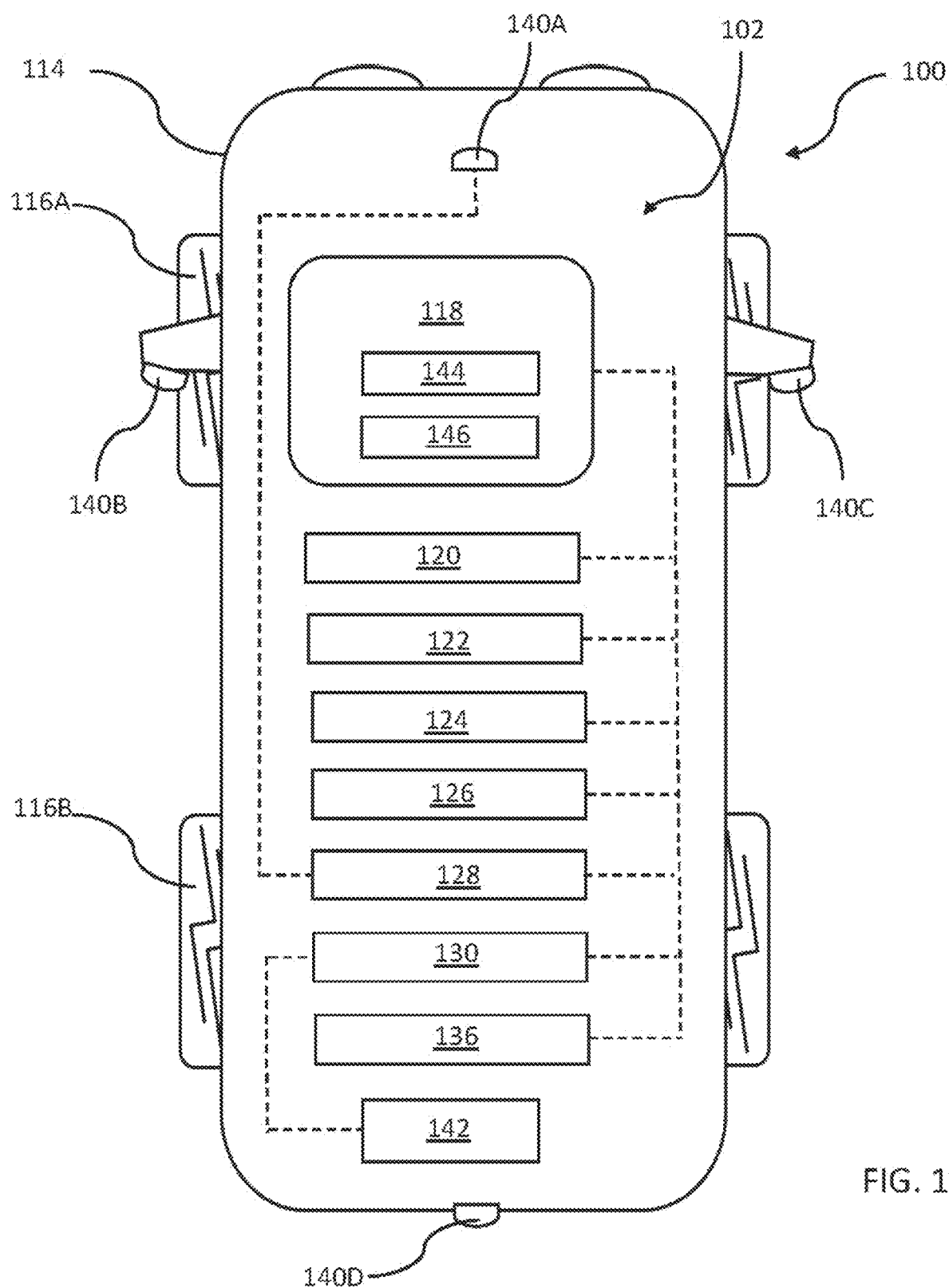
FIG. 1 is a functional block diagram representation of a vehicle equipped with an advanced driver assistance system (ADAS), according to an exemplary embodiment.

Referring to FIG. 1, a functional block diagram representation of vehicle 100 equipped with an advanced driver assistance system 102 (ADAS 102). An improved function of the ADAS 102 includes capturing a subject image of an external surrounding, comparing the subject image with a reference image, aligning the subject image with the reference image, and analyzing the aligned subject image to detect and identify road conditions in real-time as the vehicle 100 is in operation.

The vehicle 100 generally includes a body 114, front wheels 116A, and rear wheels 116B. The front wheels 116A and the rear wheels 116B are each rotationally located near a respective corner of the body 114. While the vehicle 100 is depicted as a passenger car, other examples of ADAS equipped vehicles include, but are not limited to, motorcycles, trucks, sport utility vehicles (SUVs), recreational vehicles (RVs), marine vessels, and aircraft.

As shown, the vehicle 100 generally includes at least one controller 118, a propulsion system 120, a transmission system 122, a steering system 124, a brake system 126, a vehicle sensor system 128, an actuator system 130, and a vehicle communication system 136. The propulsion system 120 may, in various embodiments, include an internal combustion engine, an electric machine such as a traction motor, and/or a fuel cell propulsion system. The transmission system 122 is configured to transmit power from the propulsion system 120 to the front wheels 116A and/or the rear wheels 116B according to selectable speed ratios. According to various embodiments, the transmission system 122 may include a step-ratio automatic transmission, a continuously variable transmission, or other appropriate transmission. The brake system 126 is configured to provide braking torque to the front wheels 116A and the rear wheels 116B. The brake system 126 may, in various embodiments, include friction brakes, brake by wire, a regenerative braking system such as an electric machine, and/or other appropriate braking systems. The steering system 124 influences a position of the front wheels 116A and/or the rear wheels 116B.

The vehicle sensor system 128 includes one or more vehicle sensing devices 140A-140D that sense observable conditions of the exterior environment and/or the interior environment of the vehicle 100. Examples of vehicle sensing devices 140 include, but are not limited to, radars, lidars, global positioning systems, optical cameras, thermal cameras, ultrasonic sensors, and/or other sensors. The actuator system 130 includes one or more actuator devices 142 that control one or more vehicle features such as for example, but not limited to, the propulsion system 120, the transmission system 122, the steering system 124, and the brake system 126.

The vehicle communication system 136 is configured to wirelessly communicate information to and from other entities ("vehicle-to-everything (V2X)" communication). For example, the vehicle communication system 136 is configured to wireless communicate information to and from other vehicles ("vehicle-to-vehicle (V2V)" communication), to and from driving system infrastructure ("vehicle to infrastructure (V2I)" communication), remote systems, and/or personal devices. In an embodiment, the vehicle communication system 136 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels designed for automotive use and a corresponding set of protocols and standards.

The controller 118 includes at least one processor 144 and a data storage device 146. The data storage device 146 is a computer readable storage device 146 and may also be referred to a computer readable media 146 and a computer readable medium 146. In an embodiment, the computer readable storage device 146 includes executable instructions for an embodiment of a method of automatic image view alignment 900 (herein "Method 900"), which is described in detail below. It should be appreciated that the data storage device 146 may be part of the controller 118, separate from the controller 118, or part of the controller 118 and part of a separate system.

The processor 144 can be any custom made or commercially available processor, a central processing unit (CPU), a graphics processing unit (GPU), an auxiliary processor among several processors associated with the controller 118, a semiconductor-based microprocessor (in the form of a microchip or chip set), a macro-processor, any combination thereof, or generally any device for executing instructions. The computer readable storage device 146 may include volatile and nonvolatile storage in a non-transitory memory unit, read-only memory (ROM), random-access memory (RAM), and keep-alive memory (KAM), for example. KAM is a persistent or non-volatile memory that may be used to store various operating variables while the processor 144 is powered down. The computer-readable storage device 146 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 118 in controlling the vehicle 100 and executing Method 900.

The instructions may include one or more separate programs, each of which comprises an ordered listing of executable instructions for implementing logical functions. The instructions, when executed by the processor 144, receive and process signals from the vehicle sensor system 128, perform logic, calculations, methods and/or algorithms for automatically controlling the components of the vehicle 100, and generate control signals to the actuator system 130 to automatically control one or more components of the vehicle 100 based on the logic, calculations, methods, and/or algorithms. Although only one controller 118 is shown in FIG. 1, alternative embodiments of the vehicle 100 can include any number of controllers 118 that communicate over any suitable communication medium or a combination of communication mediums and that cooperate to process the sensor signals, perform logic, calculations, methods, and/or algorithms, and generate control signals to automatically control features of the vehicle 100.

Figure 2A:
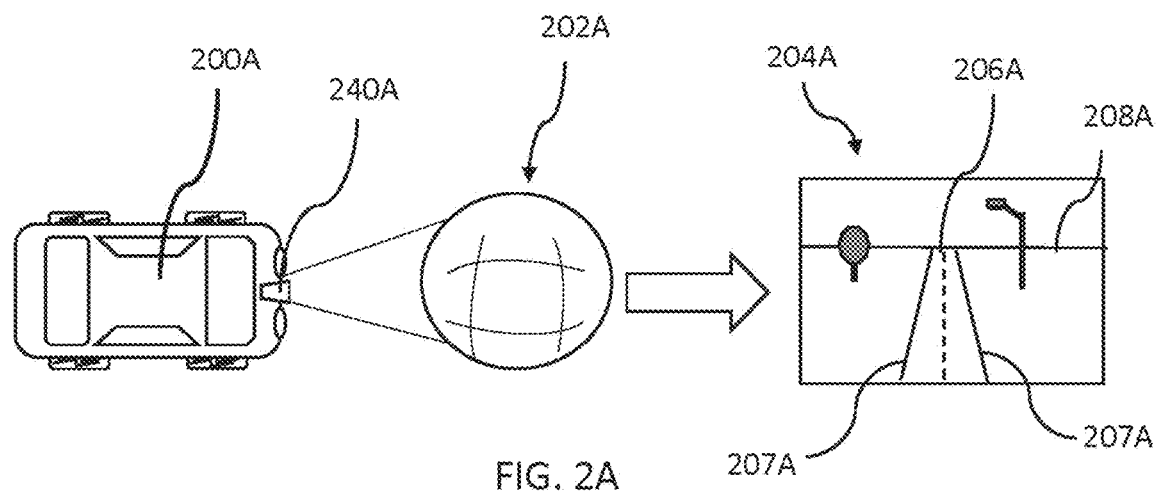
FIG. 2A is a diagram of a reference vehicle equipped with the ADAS of FIG. 1 capturing an image of a forward field of view, according to an exemplary embodiment.

Referring to FIG. 2A, a reference vehicle 200A is equipped with the ADAS 102 of vehicle 100. The reference vehicle 200A may be that of a test or development vehicle platform or a production vehicle configured for gathering data on an exterior surrounding of the reference vehicle 200A. The gathered data may be used for the development and/or training of applications for the ADAS 102.

In one exemplary embodiment, the reference vehicle 200A includes a forward mounted optical camera 240A. The optical camera 240A is equipped with a fisheye lens configured to capture a wide field of view of a forward surrounding of the reference vehicle 200A. Fisheye lenses achieve wider angles of view as compared to rectilinear lens. Instead of producing images with straight lines of perspective as those in rectilinear images, fisheye lenses produce a convex non-rectilinear distorted image 202A. While the optical camera 240A is shown mounted to the front and center of the reference vehicle 200A to capture the forward field of view, it should be appreciated that the optical camera 240A may also be mounted on the side and rear of the reference vehicle 200A to capture a side field of view and a rear field of view, respectively. The optical camera 240A may also be mounted on a lower portion of the reference vehicle 200A to capture a curbside field of view.

For use in certain ADAS 102 applications, the convex non-rectilinear distorted images 202A are transformed, also referred to as unfolded, by the controller 118 into a rectilinear undistorted image 204A, as also referred to as an undistorted image 204A or a rectilinear image 204A. The undistorted image 204A is analyzed to detect and identify road conditions for developing and training ADAS applications. Techniques for transforming fisheye distorted images into non-distorted images are disclosed in the IEEE publication "A Toolbox for Easy Calibrating Omnidirectional Cameras" by Scaramuzza, D., A. Martinelli, and R. Siegwart, which is incorporated by reference in its entirety.

Figure 2B:
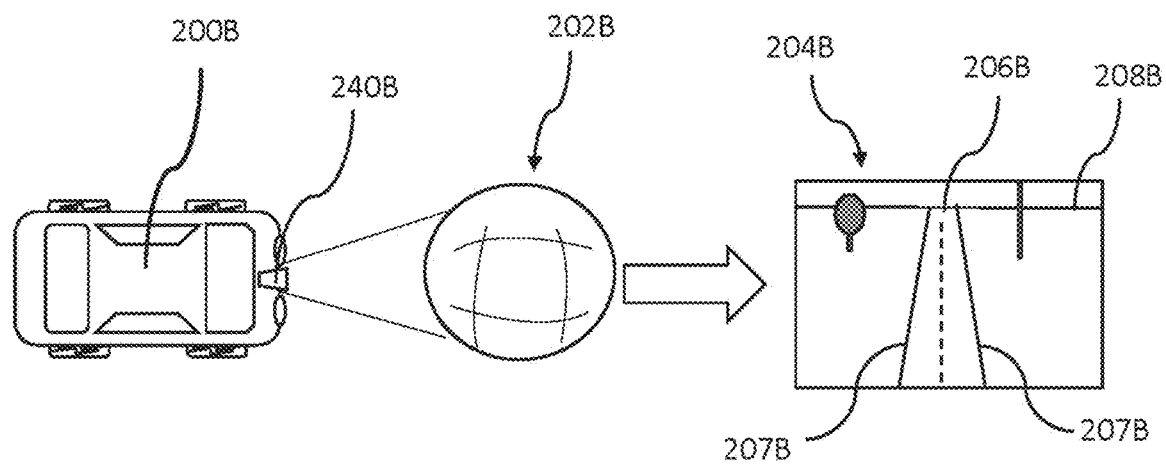
FIG. 2B is a is a diagram of a subject vehicle equipped with the ADAS of FIG. 1 capturing an image of a forward field of view, according to an exemplary embodiment.

Referring to FIG. 2B, the subject vehicle 200B may be that of a production vehicle equipped with the ADAS 102 of vehicle 100. The ADAS applications developed from images captured by the reference vehicle 200A may be uploaded to the subject vehicle 200B for real-time implementations. Similar to the reference vehicle 200A, the subject vehicle 200B includes a center front mounted optical camera 240B equipped with a fisheye lens configured to capture a wide field of view of a forward surrounding of the subject vehicle 200B. The convex non-rectilinear distorted image 202B captured by the optical camera 240B is transformed into a rectilinear undistorted image 204B, which is used to detect and identify road conditions in real-time. The undistorted image 204B may be uploaded to the reference vehicle 200A and other similarly equipped subject vehicles.

However, due to the variability in mounting locations and assemblies of the optical cameras 240B onto various make and models of subject vehicles 200B, the undistorted image 204B of the subject vehicle 200B may have feature points that may not be aligned with the corresponding feature points of the undistorted image 204A captured by the reference vehicle 200A. Even in a best-case scenario where the subject vehicle 200B is the same make and model as that of the reference vehicle 200A, the feature point in subject image 204B (subject feature point) may be off set from the corresponding feature point in the reference image 204A (reference feature point) due to variability in build and assembly of the subject vehicle 200B. It is preferable the subject feature point and the reference feature point are of the same subject matter. In the exemplary embodiment, the feature points shown are vanishing points 206A, 206B, where forward extending parallel lines 207A, 207B meet at the horizons 208A, 208B. The feature points may also be the horizons 208A, 208B themselves.

It is advantages that the undistorted image 204B of the subject vehicle 200B has similar, if not the same, visual proportions and perspective as those of the undistorted image 204A obtained by the reference vehicle 200A. Offset, or non-aligned images 204A, 204B, may create extra demand on the controller 118 to detect and identify road conditions in real-time resulting in less-than-optimal performance of the ADAS. Aligned images from the subject vehicle 200B may also be used to enable the reusability of data from other subject vehicles and additionally enhanced performance of the other subject vehicles.

Referring to FIG. 3A and FIG. 3B. FIG. 3A is an undistorted image 300A transformed from a fisheye distorted image taken by the front camera 240A on the reference vehicle 200A. FIG. 3B is an undistorted image 300B transformed from a fisheye distorted image taken by the front camera 240B on the subject vehicle 200B. The undistorted images 300A and 300B are not necessarily images of the same stretch of roadway 302A, 302B, but includes similar features such as lane markings 304A, 304B extending to and meeting at a distance vanishing point 306A, 306B at the horizon 308A, 308B. When the image 300A is compared side-by-side with the image 300B, the horizon 308B of the undistorted image 300B is shown vertically off-set from the horizon 308A of the undistorted image 300A by a difference of distance (d), which can be determined based on a number of pixels between the horizons 308A, 308B or in units of length such as millimeters (mm). In the undistorted image 300A, the horizon 308A partitions a sky portion RS from the ground portion RG in the image frame 310A. In the undistorted image 300B, the horizon 308B partitions a sky portion SS from the ground portion SG in the image frame 310B. The ratio of sky-to-ground (RS:RG) in the undistorted image 300A is less than the ratio of sky-to-ground (SS:SG) in the undistorted image 300B.

FIG. 4A is an undistorted image 400A transformed from a fisheye distorted image taken by the front camera 240A on the reference vehicle 200A. FIG. 4B is an undistorted image 400B transformed from a fisheye distorted image taken by the front camera 240B on the subject vehicle 200B. One method of aligning the undistorted image 400B with the reference undistorted image 400A is by shifting the undistorted image 400B in the image frame 410B such that the horizons 406A and 406B are aligned. This method provides a sky portion RS equal to the sky portion SS'. However, the ground portion RG does not equal to the ground portion SG' due to missing image data in portion SX. The portion SX is blank in the image frame 410B because the image data from the source fisheye distorted image was not utilized in the transformation of the image 400B from the fisheye distorted image. Therefore, the ratio of RS:RG does not equal the ratio of SS':SG'.

FIG. 5A is an undistorted image 500A transformed from a fisheye distorted image, also referred to as a reference fisheye image, taken by the front camera 240A of the reference vehicle 200A. FIG. 5B is an undistorted image 500B transformed from a subject fisheye distorted image, also referred to as a subject fisheye image, taken by the front camera 240B of the subject vehicle 200B. The ratio of RS:RG is substantially equal the ratio of SS":SG". Substantially equal means+/−5%.

The subject undistorted image 500B is aligned with the reference undistorted image 500A by determining the distance (d) between the vanishing points 506A, 506B or horizon 508A, 508B of the reference undistorted image 500A and the subject undistorted image 500B, calculating a pitch angle ϴ to align the subject feature point with the reference feature point when the determined distance (d) is greater than a predetermined threshold, and applying a rectification transformation on the subject fisheye image by relocating a center of projection of the subject fisheye image by the pitch angle ϴ to produce the undistorted image 500B shown in FIG. 5B.

In the example presented, the vanishing points 306A, 306B and horizons 308A, 308B were chosen as feature points for comparison between the subject image 300B and reference image 300A, because in real time, scenes in the image frames varies largely. It is desirable to find some universal feature points in the world frame to enable egg-to-egg comparison in the image frames 310A, 310B. The vanishing points 306A, 306B and horizons 308A, 308B of each the images 300A and 300B can be determined by utilizing a Hough transform. The Hough transform is a general technique for identifying the locations and orientations of certain types of feature points in a digital image.

Figure 6A:
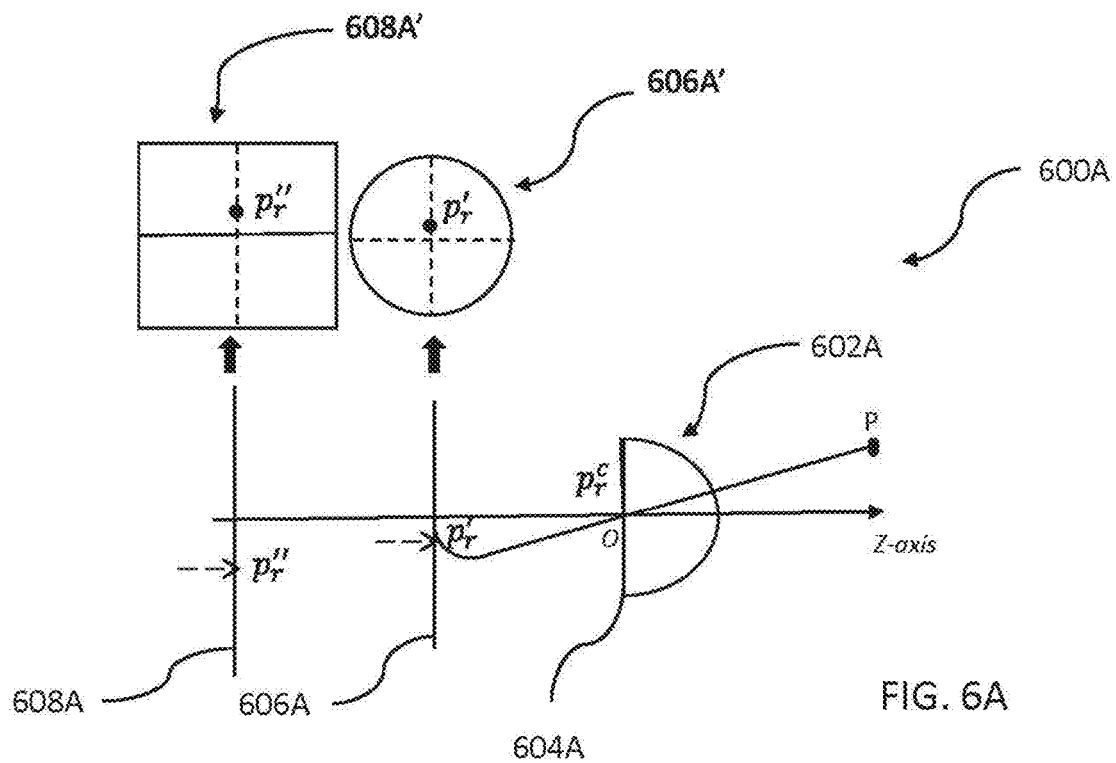
FIG. 6A is a schematic diagram of a ray of light traveling from through an optical camera having a fisheye lens on a reference vehicle, according to an exemplary embodiment.

Referring to FIG. 6A. Shown is a schematic diagram 600A of a ray of light traveling from a feature point P in the world frame, such as the vanishing point or the horizon, through an optical camera having a fisheye lens 602A on the reference vehicle 200A. The coordinates of the ray of light are shown as $p_r^c$ in the camera frame 604A, $p'_r$ in the raw image frame 606A, and $p''_r$ in the undistorted image frame 608A. The world frame is a fixed coordinate system for representing objects such as points, lines, surfaces, etc. in the real world. The camera frame is coordinate system that uses the camera center as its origin. The image plane is a plane on which the image is formed. The planar view 606A' of the raw image frame 606A and the planar view 608A' of the undistorted image frame 608A show the inverted positions of $p'_r$ and $p''_r$, respectively. A light ray in the direction of the z-axis passes through the optical center O of the fisheye lens 602S and perpendicular to the raw image frame 606A' and the undistorted image plane 608A'.

Figure 6B:
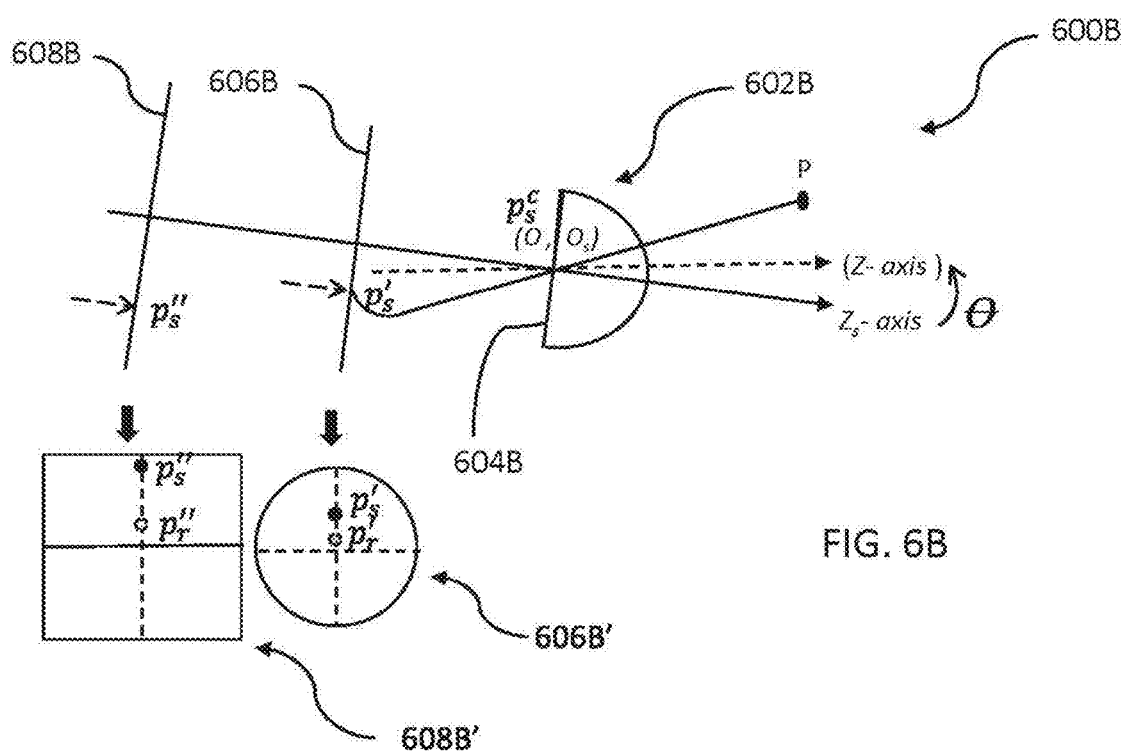
FIG. 6B is a schematic diagram of a ray of light traveling from through an optical camera having a fisheye lens on a subject vehicle, according to an exemplary embodiment.

Referring to FIG. 6B. Shown is a schematic diagram 600B of a ray of light traveling from the feature point P in the world frame, such as the vanishing point or the horizon, through an optical camera having a fisheye lens 602B on subject vehicle 200B. The coordinates of the ray of light are shown as $p_s^c$ in the camera frame 604B, $p'_s$ in the raw image frame 606B, and $p''_s$ in the undistorted image frame 608A. The planar view 606B' of the raw image frame 606B and the planar view 608B' of the undistorted image frame 608B show the inverted positions of $p'_s$ and $p''_s$, respectively. A light ray in the direction of the $Z_s$-axis passes through the optical center $O_s$ of the fisheye lens 6002B and perpendicular to the raw image frame 606B and the undistorted image frame 608B.

Referring to image frames 606B' and 608B', the vertical coordinates of $p'_s$ and $p''_s$ of the subject vehicle are off set from the coordinates of $p'_r$ and $p'_r$ of the reference vehicle. A ray P in world frame, can be mapped into the image frame once calibration parameters are obtained:

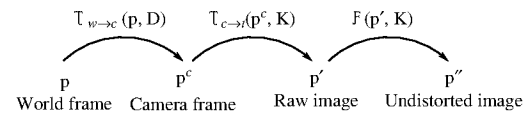

$$\underbrace{T_{w \to c}(p, D)}_{} \quad \underbrace{T_{c \to I}(p^c, K)}_{} \quad \underbrace{F(p', K)}_{}$$

p     $p^c$     p'     p''
World frame   Camera frame   Raw image   Undistorted image Where:
K=intrinsic camera parameters, and
D=extrinsic camera parameters.

Intrinsic camera parameters are camera parameters that are internal and fixed to a particular camera. Intrinsic camera parameters allow a mapping between camera coordinates and pixel coordinates in the image frame. Extrinsic camera parameters are camera parameters that are external to the camera and may change with respect to the world frame. Extrinsic parameters define the location and orientation of the camera with respect to the world frame.

Given the vanishing point positions $p''_r$, $p''_s$ in the reference image frame 608A and the subject image frame 608B, respectively, an inverse transformation can obtain their camera coordinates $p_r^c$: ($x_r$, $y_r$, $z_r$) and $p_s^c$: ($x_s$, $y_s$, $z_s$):
Where:

$$p_r^c = T_{c \to I}^{-1}(F^{-1}(p''_r, K), K), \text{ and}$$

$$p_s^c = T_{c \to I}^{-1}(F^{-1}(p''_s, K), K)$$

The amount of offset can be defined by an angle ϴ which is the angle between the Z-axis and the $Z_s$-axis. To vertically align the coordinates of $p'_s$ and $p''_s$ with $p'_r$ and $p''_r$, the projection center of the fisheye lens 602B can be adjusted by pitching the projection center up or down to the reference projection center before transforming the distorted image to the undistorted image. The relative pitch angle ϴ can be calculated as follows:

$$\theta = \arccos \frac{z_s}{\sqrt{p_s^{c^T} p_s^c}} - \arccos \frac{z_r}{\sqrt{p_r^{c^T} p_r^c}}$$

$$= \arccos \frac{z_s}{\sqrt{x_s^2 + y_s^2 + z_s^2}} - \arccos \frac{z_r}{\sqrt{x_r^2 + y_r^2 + z_r^2}}$$

Where:
$\sqrt{p_r^{c^T} p_r^c}$ is the distance from the origin O of the reference camera coordinate system to the vanishing point P, or the magnitude of $\overrightarrow{OP}$, that is $|\overrightarrow{OP}|$; and $\sqrt{p_s^{c^T} p_s^c}$ is the distance from the origin $O_s$ of the subject camera coordinate system to the vanishing point P, or say the magnitude of $\overrightarrow{O_sP}$, that is $|\overrightarrow{O_sP}|$.

If the subject camera only has orientation (pitch) error, O and $O_s$ are overlapped. Therefore, $|\overrightarrow{OP}|=|\overrightarrow{O_sP}|$, then $$p_r^{c^T} p_r^c = x_r^2 + y_r^2 + z_r^2 = p_s^{c^T} p_s^c = x_s^2 + y_s^2 + z_s^2$$

Where:

$p_r^c$:$(x_r, y_r, z_r)$ and $p_s^c$:$(x_s, y_s, z_s)$ are 3D coordinates of the vanishing points in the reference camera frame and the subject camera frame, respectively.

The estimated relative pitch value is saved in the non-transitory memory unit. When the subject vehicle is operating, the estimated relative pitch value is loaded, and a rotation transformation matrix is computed accordingly and applied to adjust the un-distortion mapping function $\mathbb{F}$:

$$\mathbb{F}(Rp', K)$$
$$\text{with } R = \begin{pmatrix} 1 & 0 & 0 \\ 0 & \cos\theta & -\sin\theta \\ 0 & \sin\theta & \cos\theta \end{pmatrix}$$

The subject image frame is then adjusted with a new projection center aligned with the refence camera project center. An undistorted and aligned subject image is computed and sent to the controller.

Figure 7:
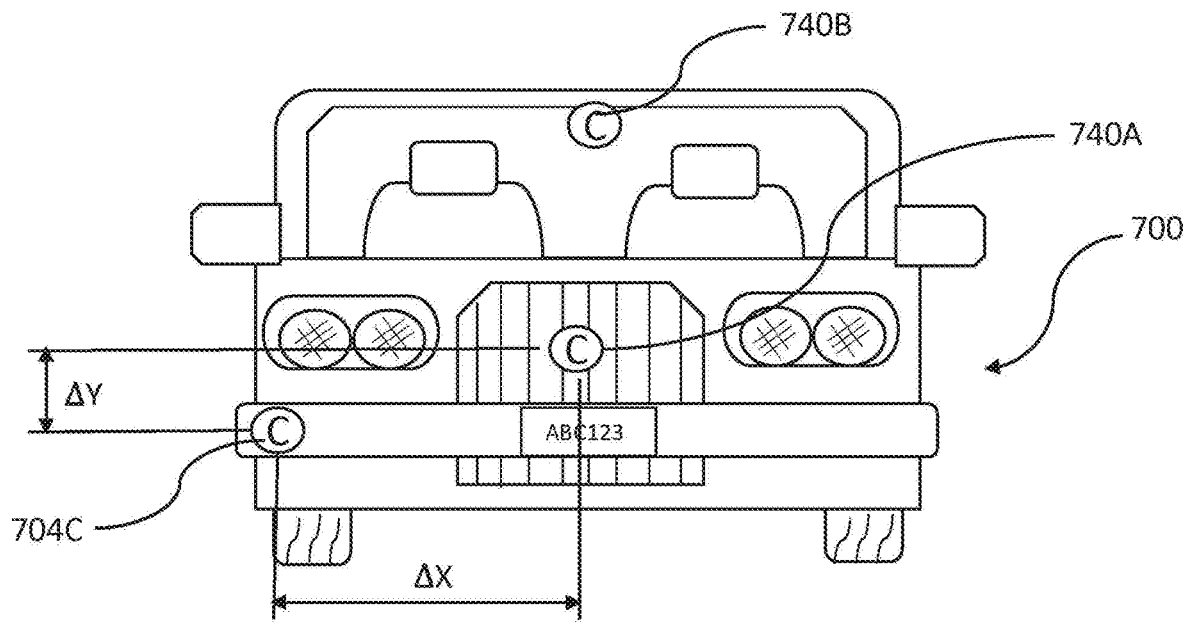
FIG. 7 is a schematic illustration of a front view of a subject vehicle having a plurality of optical cameras, according to an exemplary embodiment.

Referring to FIG. 7 is a schematic illustration of a front view of a subject vehicle 700 having a plurality of optical cameras 740A-740C configured to capture a forward view of the subject vehicle 700. The subject vehicle 700 includes a center mounted camera 740A located in a middle portion of the front profile of the vehicle 700, a top mounted a camera 740B located near the top of the vehicle 700, and a curb-side mounted camera 740C located in a lower-side of the vehicle 700.

Figure 10:
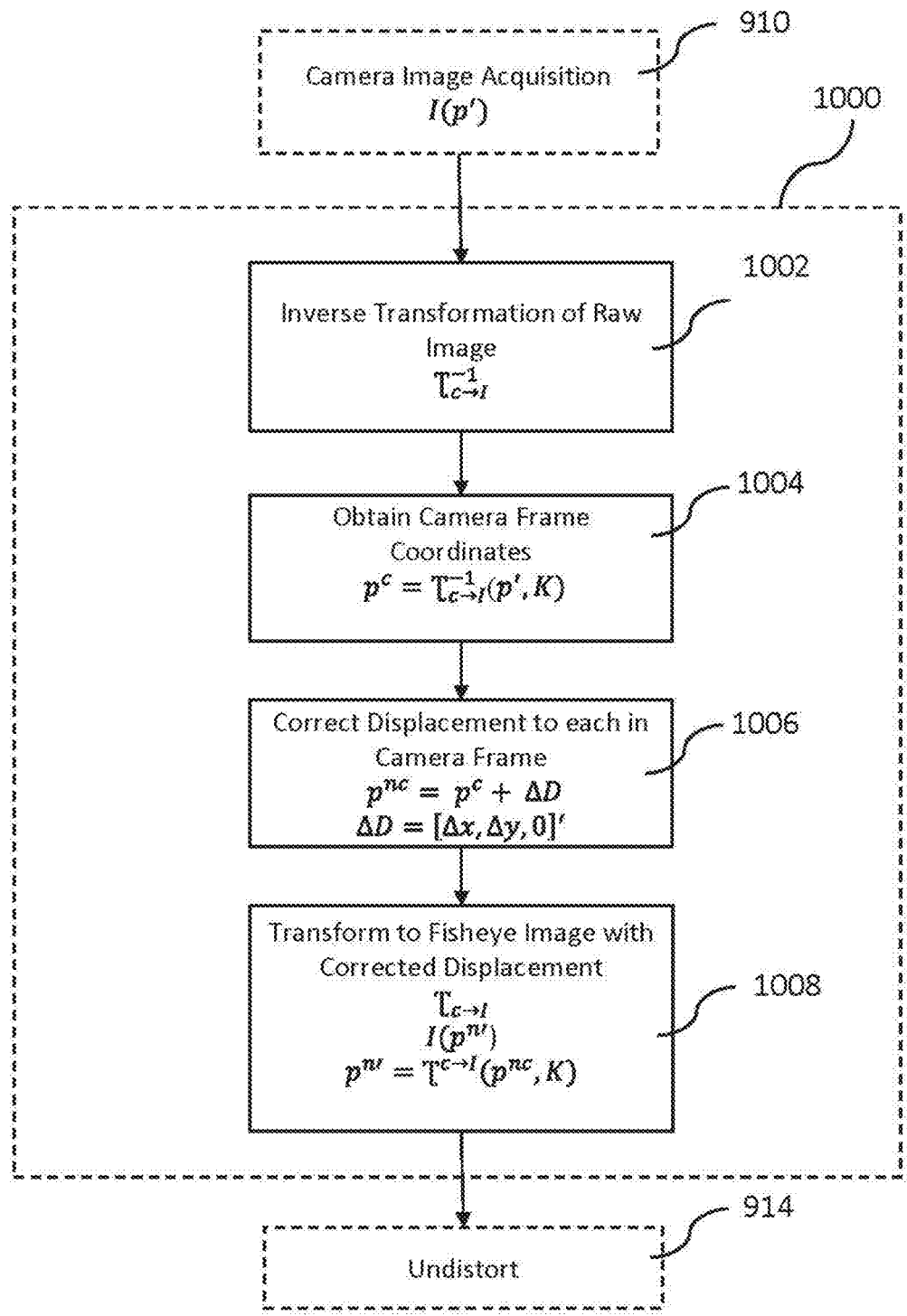
FIG. 10 is a block flowchart of Block 1000 of FIG. 9A showing a method of correcting a displacement of a subject camera, according to an exemplary embodiment.

If a reference camera is mounted in the middle portion of a reference vehicle, and a subject camera is mounted on the curb-side of the subject vehicle, then there may be difference in viewing angles between the subject image and the reference image. In the example shown, the displacement in the vertical distance between a center mounted camera 740A and the curb camera 740C is $\Delta Y$ and the displacement in the horizontal distance is $\Delta X$. Any displacements between the reference camera and the subject camera are corrected prior to correcting orientation non-alignment errors. A Block diagram presenting a method of correcting the displacement difference is shown in FIG. 10 and described in detail below.

Figure 8A:
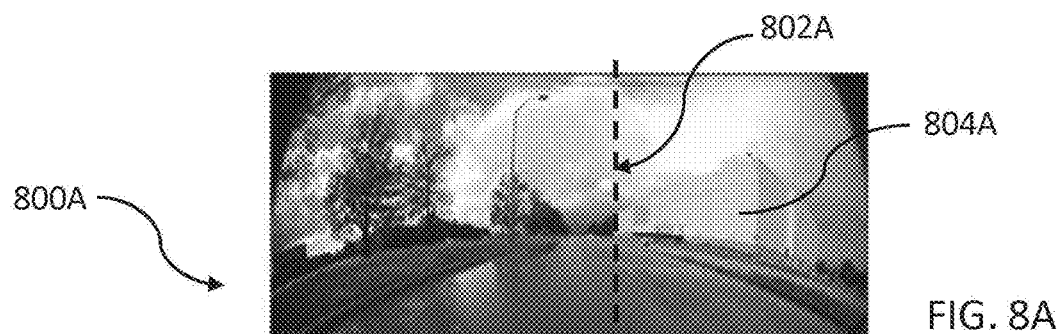
FIG. 8A is a fisheye distorted image taken from a center mounted camera on the subject vehicle of FIG. 7, according to an exemplary embodiment.
Figure 8B:
FIG. 8B is a fisheye distorted image taken from a curb-side mounted camera on the subject vehicle of FIG. 7, according to an exemplary embodiment.

Referring to FIG. 8A, shown is a fisheye image 800A capture by the center mounted camera 740A of FIG. 7. Referring to FIG. 8B, shown is a fisheye image 800B capture by the curb-mounted mounted camera 740C of FIG. 7. The image 800A and image 800B are taken at the same location, but using cameras mounted on different locations on the vehicle 700. Due to a parallax effect, a vertical line 802A along an end of building 804A of Image 800A is not aligned with a vertical line 802B along the end of building 804B of Image 800B. This non-alignment is correctable by inverse-transforming the fisheye image 800B to a camera frame (also known as a raw image frame in the camera coordinate system), obtaining the coordinates of each image point in the camera frame, correct the coordinates of the camera frame to match the coordinates of the camera frame of the reference vehicle, and transforming the corrected coordinates back to the fisheye image.

Figure 9A:
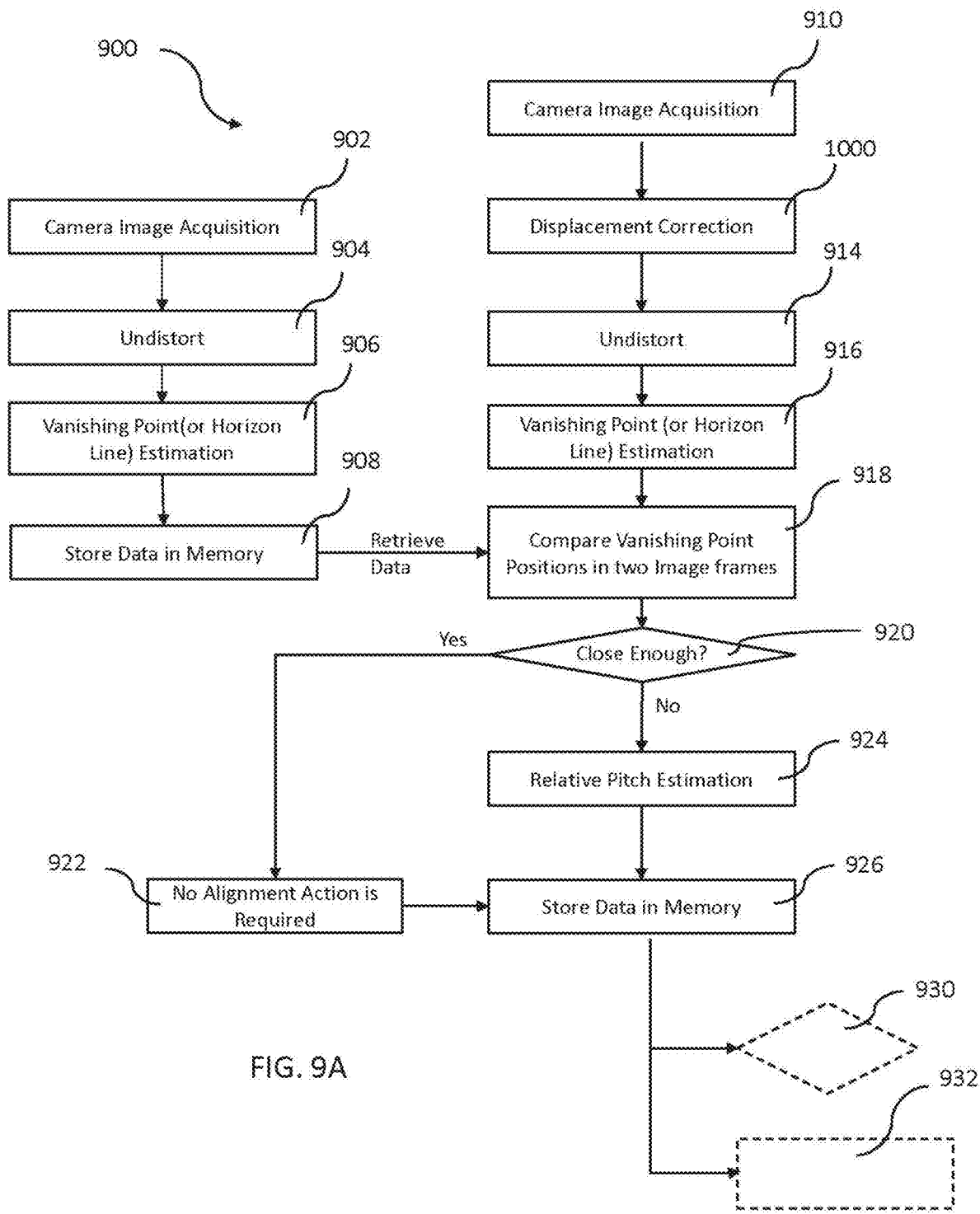
FIG. 9A is a first portion of a block flowchart showing a method of automatic image view alignment, according to an exemplary embodiment.

Referring to FIG. 9A, shown is a first portion of a block flowchart showing the method of automatic image view alignment for a camera-based road condition detection (herein "Method 900"). The Method 900 begins in Block 902.

Referring to Block 902, an optical camera mounted on a reference vehicle captures an image of an external field of view surrounding the reference vehicle. The optical camera is equipped with a fisheye lens to obtain a wide-angle view. The captured image is distorted due to the fisheye lens. Proceeding to Block 904, a controller transforms the distorted image into a rectilinear non-distorted image. Proceeding to Block 906, a feature point such as a horizon or a vanishing point is chosen, and the coordinates of the feature point is determined. Proceeding to Block 908, the rectilinear non-distorted image including the coordinates of the feature point is stored in a non-transitory memory unit on the reference vehicle, a cloud server, or a subject vehicle. The reference image is retrievable by the subject vehicle.

Referring to Block 910, an optical camera having a fisheye lens captures an image of an area surrounding a subject vehicle. The captured image is distorted due to the fisheye lens. Proceeding to Block 1000, this step is applicable when the subject camera is mounted on the subject vehicle in a different location than the reference camera mounted on the reference vehicle.

Referring to back to FIG. 6 and to FIG. 10, proceeding to Block 1002 from Block 910, the distorted image is inverse transformed to a camera frame. Proceeding to Block 1004, the coordinates of the camera frame are obtained. Proceeding to Block 1006, the displacement of the coordinates of the camera frame of the subject vehicle are corrected to match the coordinates of the camera frame of the reference vehicle. Proceeding to Block 1008, the camera frame of the subject vehicle having the corrected displacement is transformed back to the fisheye distorted view.

Where:

I(p') is the distorted image;

$T_{c \to I}^{-1}$ is the inverse transformation function from fisheye image to the camera frame;

$p_c = T_{c \to I}^{-1}(p', K)$ is the camera frame coordinates;

$p^{nc} = p^c + \Delta D$ is the corrected displace in the camera frame;

$\Delta D = [\Delta x, \Delta y, 0]'$ is the difference in displacement between the subject camera and the reference camera;

$T_{c \to I}$ is the transformation function from camera frame to the fisheye image;

$I(p^{n'})$ is the transformed fisheye image with the correct displacement; and $p^{n'} = T^{c \to I}(p^{nc}, K)$ is the coordinates of the corrected displacement.

Referring back to FIG. 9A, proceeding to Block 914 from Block 1000, a controller transforms the distorted image into a rectilinear non-distorted image. Proceeding to Block 916, the coordinates of a feature point corresponding to the same feature point from Block 906, such as the horizon or the vanishing point is determined. Proceeding to Block 918, a difference in vertical distance (d) is determined between the feature point of the subject vehicle (also referred to as "subject feature point") in the subject image and the feature point of the reference vehicle (also referred to as "reference feature point") in the reference image.

Proceeding to Block 920, when the difference in the vertical distance (d) is less than a predetermined threshold, the Method 900 proceeds to Block 922 and note a no alignment action is requested. Proceeding to Block 926, the no alignment action requirement is flagged in the memory.

Referring back to Block 920, when the difference in the vertical distance(d) is greater than the predetermined threshold, the Method 900 proceeds to Block 924. An alignment action is required is flagged and a relative pitch estimation is calculated to vertically align the feature point in the non-distorted image of the subject vehicle with the feature point in the non-distorted image of the reference vehicle. Proceeding to Block 926, an alignment flag and Θ the estimated pitch angle is stored in the memory on the subject vehicle.

Figure 9B:
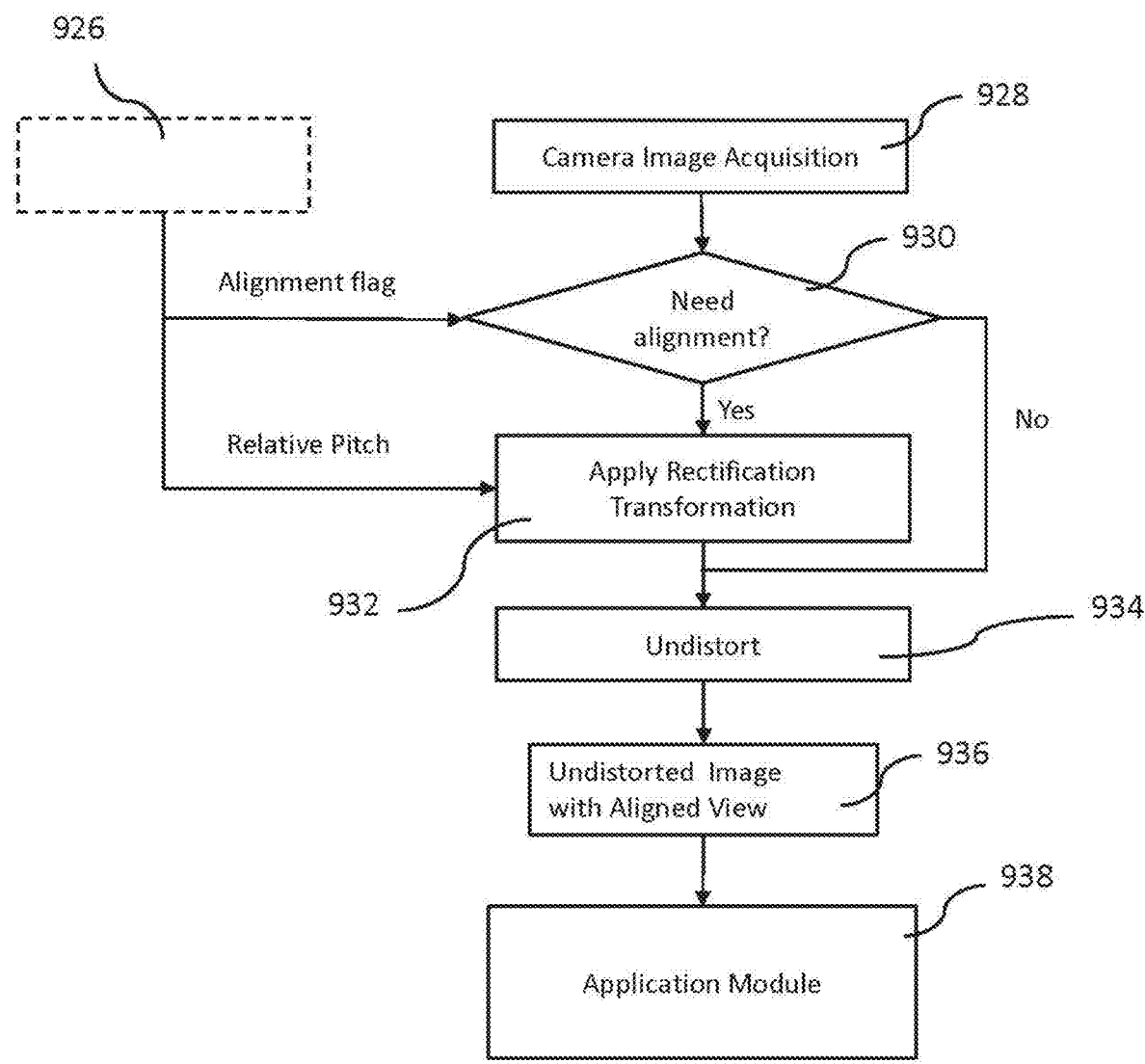
FIG. 9B is a second portion of the block flowchart of FIG. 9A, according to an exemplary embodiment.

Referring FIG. 9B, which is continuation of FIG. 9A. Referring to Block 928, in real time, the subject camera captures additional images. Proceeding to Block 930 from Block 928, the controller determines whether the alignment flag is present from Block 926. Proceeding to Block 934 when the alignment flag is not present.

Referring back to Block 930, proceeding to Block 932 when an alignment flag is present. In Block 932, applying a rectification transformation by relocation of the center of projection of the fisheye image by the angle Θ from Block 926. Proceeding to Block 934, the subject fisheye image is unfolded into a subject rectilinear image. Proceeding to Block 936, confirming the subject rectilinear image is aligned with the reference rectilinear image. Proceeding to Block 938, the subject aligned rectilinear image is forwarded to the controller or an application module.

The Method 900 provides an algorithmic approach and framework to automatically align image view of a subject camera, either offline or in real time, with that of a reference camera to compensate for mounting variances on a vehicle. The Method 900 enables data reusability from different vehicles, enhance real-time performance of vision system of vehicle, and broaden application range of camera-based applications for ADAS which share similar image views. The method 900 further increases performance, reliability, and robustness of image base applications for ADAS.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

The invention claimed is:

1. A method of image alignment for an advanced driver assistance system (ADAS) equipped vehicle, comprising:
capturing, by an optical camera having a fisheye lens, a subject fisheye image of an external field of view surrounding the vehicle;
transforming, by a controller, the subject fisheye image into a subject rectilinear image, wherein the subject rectilinear image includes a subject feature point;
retrieving a reference rectilinear image of an external field of view surrounding a reference vehicle, wherein the reference rectilinear image includes a reference feature point;
determining a distance (d) between the subject feature point in the subject rectilinear image and the reference feature point in the reference rectilinear image, wherein the subject rectilinear image is compared side-by-side to the reference rectilinear image;
determining whether the distance (d) is greater than a predetermined threshold;
calculating a pitch angle Θ to align the subject feature point with the reference feature point in response to the determined distance (d) is greater than the predetermined threshold; and
generating an aligned subject rectilinear image by applying a rectification transformation on the subject fisheye image by relocating a center of projection of the subject fisheye image by the pitch angle Θ.

2. The method of claim 1, further comprising:
generating an alignment requirement flag in response to the determined distance (d) is greater than the predetermined threshold; and
storing the alignment requirement flag and the calculated pitch angle Θ in a non-transitory memory unit.

3. The method of claim 2, further comprising:
capturing a second subject fisheye image of the external field of view surrounding the vehicle;
determining whether the alignment requirement flag is stored in the non-transitory memory unit; and
applying the rectification transformation on the second subject fisheye image by relocating a center of projection of the second subject fisheye image by the pitch angle Θ in response to the alignment requirement flag determined to be stored in the non-transitory memory unit.

4. The method of claim 3, further comprising:
inverse-transforming the subject fisheye image into a subject camera frame;
correcting subject camera frame to match a coordinate of a reference camera frame;
transforming the corrected subject camera frame into a corrected subject fisheye image; and
transforming the corrected subject fisheye image into the subject rectilinear image.

5. The method of claim 4, wherein the subject feature point includes at least one of a vanishing point and a horizon.

6. The method of claim 5, wherein the distance (d) is a vertical distance.

7. The method of claim 6, further comprising:
generating the aligned subject rectilinear image in real-time;
sending the aligned subject rectilinear image to the controller; and
analyzing the aligned subject rectilinear image by the controller to execute an ADAS application.

8. The method of claim 1, wherein:
the aligned subject rectilinear image includes a sky portion to a ground portion ratio of SS":SG", and
the reference rectilinear image includes a sky portion to a ground portion ration of RS:RG,
wherein SS:SG is substantially equal to RS:RG.

9. The method of claim 1, wherein the pitch angle Θ is calculated by:

$$\theta = \arccos\frac{z_s}{\sqrt{x_s^2 + y_s^2 + z_s^2}} - \arccos\frac{z_r}{\sqrt{x_r^2 + y_r^2 + z_r^2}}$$

where:
$x_s$, $y_s$, and $z_s$ are the coordinates of the subject feature point in a subject camera coordinate system; and
$x_r$, $y_r$, and $z_r$ are the coordinates of the reference feature point in a reference camera coordinate system;
wherein the subject feature point and the reference feature point are the same subject matter.

10. The method of claim 1, wherein the pitch angle Θ is applied in an un-distortion mapping function:

$$F(Rp', K)$$

-continued where:

$$R = \begin{pmatrix} 1 & 0 & 0 \\ 0 & \cos\theta & -\sin\theta \\ 0 & \sin\theta & \cos\theta \end{pmatrix}$$

p'=coordinate on a raw image plane; and
K=intrinsic camera parameters.

11. A non-transitory computer readable medium comprising instructions stored thereon for aligning an image view for a vehicle, that upon execution by a processor, cause the processor to:
- transform a subject fisheye image into a subject rectilinear image;
- comparing the subject rectilinear image side-by-side with a reference image;
- determine a distance (d) between a subject feature point in the subject rectilinear image and a reference feature point in the reference rectilinear image;
- calculate a pitch angle θ to align the subject feature point with the reference feature point in response to the determined distance (d) is greater than a predetermined threshold; and
- generate an aligned subject rectilinear image by applying a rectification transformation on the subject fisheye image by relocating a center of projection of the subject fisheye image by the pitch angle θ.

12. The non-transitory computer readable medium of claim 11, wherein the pitch angle θ is applied in an un-distortion mapping function:

$$F(Rp', K)$$

where:

$$R = \begin{pmatrix} 1 & 0 & 0 \\ 0 & \cos\theta & -\sin\theta \\ 0 & \sin\theta & \cos\theta \end{pmatrix}$$

p'=coordinate on a raw image plane; and
K=intrinsic camera parameters.

13. The non-transitory computer readable medium of claim 11, wherein the aligned rectilinear image includes a sky to ground ratio (SS":SG") substantially similar to a sky to ground ratio (RS:RG) of the reference rectilinear image.

14. The non-transitory computer readable medium of claim 11, wherein the stored instructions further cause the processor to generate and analyze the aligned subject rectilinear image in real time for the execution of an advanced driver assistance systems application.

15. The non-transitory computer readable medium of claim 11, wherein the stored instructions further cause the processor to:
- generate an alignment requirement flag in response to the determined distance (d) is greater than the predetermined threshold; and
- store the alignment requirement flag and the calculated pitch angle θ in a non-transitory memory unit.

\* \* \* \* \*